FIG. I.

INVENTOR.
ROGER L. LOGAN

Patented Aug. 31, 1954

2,688,031

UNITED STATES PATENT OFFICE 2,688,031

HYDROXYLATION OF FATTY MATERIALS

Roger L. Logan, Elkins Park, Pa., assignor to Kessler Chemical Co., Inc., Philadelphia, Pa., a corporation of Pennsylvania Application February 4, 1952, Serial No. 269,725

7 Claims. (Cl. 260—406)

This invention relates to a method of converting unsaturated fatty materials to polyhydroxy compounds utilizing persulfuric acid.

It has long been known in the art to hydroxylate unsaturated fatty materials to polyhydroxyl fatty materials. Performic and peracetic have been used, and in general they produce excellent grades of hydroxylated materials. However, these methods are commercially unsatisfactory because the low per acids used for hydroxylating cannot be regenerated in a practically manner. Generally the per acids are made by adding aqueous hydrogen peroxide to anhydrous fatty acids, or by the addition of some persalt, such as potassium persulfate. The residual acetic or formic acids become dilute from the water left by the aqueous hydrogen peroxide and must be concentrated by expensive azeotropic distillation, which is further complicated by small amounts of fatty materials left in the low fatty acid. If per salts are used to supply the oxygen, they leave as a residue large quantities of salts which must be disposed of. Further, these methods are not commercially feasible since at least one mole of acetic or formic acid stays on the fat molecule and must be removed by alkaline saponification, followed by acid hydrolysis or, in the case of esters, by alcoholysis with a short chain alcohol.

Previous workers have reported that the use of persulfuric acid as a hydroxylating agent results in the formation of sulfonated materials, lactones, polymers, and the shifting of double bonds out of position. It is, therefore, unexpected to use persulfuric acid in such a way as to cause quantitative hydroxylation with no side products. It is even more unexpected that the concentration of spent hydroxylating solution is such that it can be economically regenerated by anodic oxidation in an electrolytic cell.

It is the object of this invention to provide a method for quantitatively hydroxylating unsaturated fatty materials with no side products. By quantitative hydroxylation is meant getting 85% or more hydroxylation, which percentage is within the range of commercial practicability.

A further object of this invention is to provide a hydroxylating medium which is capable of inexpensive anodic oxidation in an electrolytic cell so that the spent solutions may be regenerated economically and without the addition of water-containing per compounds.

An additional object of this invention is to provide a method for processing the hydroxylated product which does not involve alkaline saponification followed by acid hydrolysis.

Figure 1:
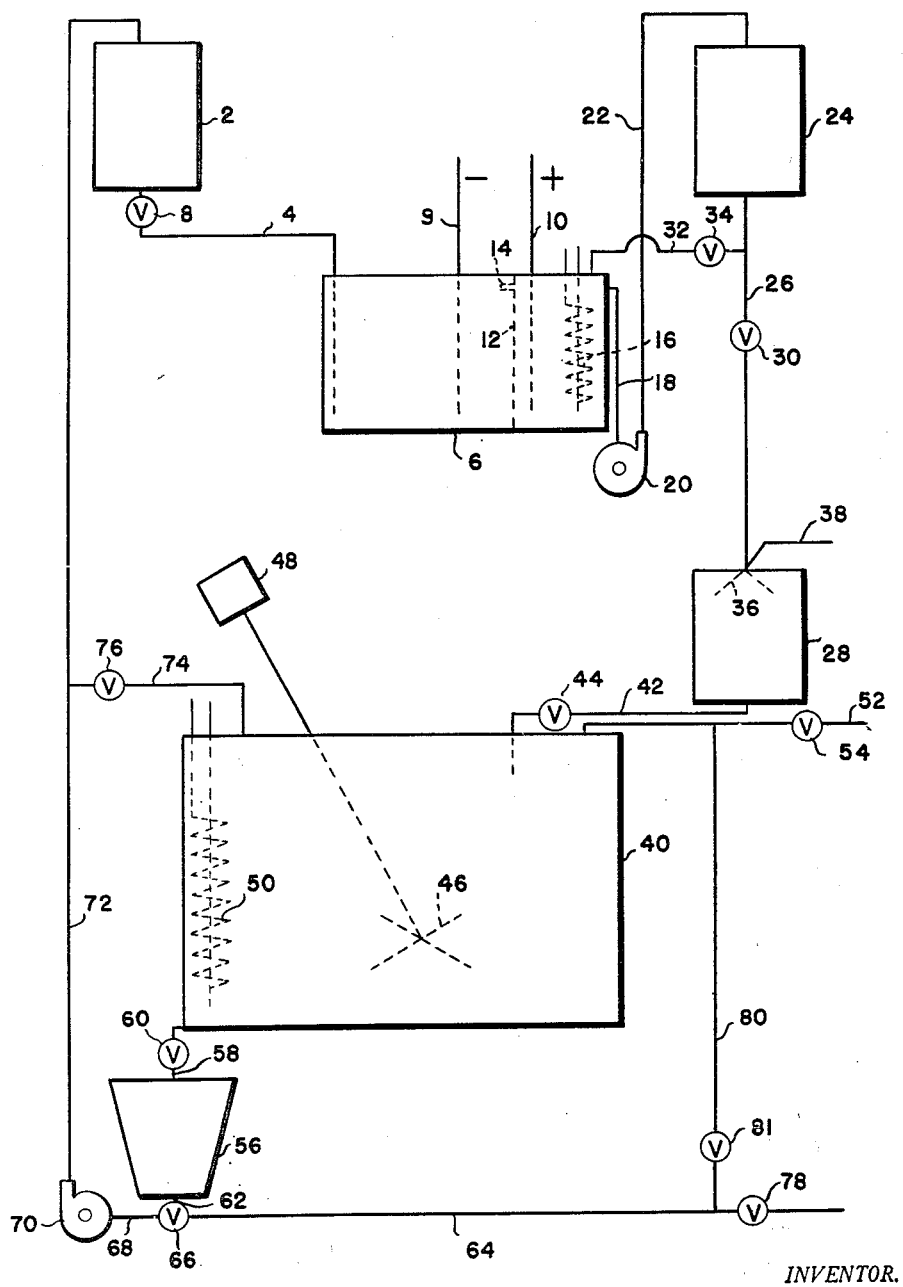
Figure 1 is a schematic diagram of apparatus for carrying out the method of this invention.

I have discovered that there are many variables which must be controlled to produce quantitative hydroxylation of ethylenic substances. I have further discovered that the spent solutions of the correct concentrations may be fed into the back streams of an electrolytic cell and thence to the anolyte for regeneration.

I have also discovered that there are formed under correct conditions two different sulfate esters, one the monosulfate ester, and the second the disulfate ester. These two esters coexist and the monosulfate ester appears to be present in the greater quantity. The monosulfate ester is very unstable and will hydrolyze on standing in warm or hot water. The disulfate ester readily hydrolyzes with boiling water. If the method of my invention is used, there is no sulfonation, a result which is unexpected in view of the prior art.

I have found that when the method of this invention is used to hydroxylate, there is no shifting of double bonds and hence no lactone formation, a surprising result. High temperature alkaline scission of the hydroxylated fatty materials, and isolation and identification of the dibasic and monobasic acids shows that there is no shifting of the double bond. Thus, for example, oleic acid can be quantitatively hydroxylated to 9,10 dihydroxy stearic acid, or erucic acid to 13,14 dihydroxy behenic acid.

Circulation of the spent sulfuric acid of the correct concentration to an electrolytic cell is the most economical method of regenerating the spent sulfuric. The cost of current for electrolytic regeneration of the spent sulfuric acid is about $\frac{1}{10}$ of the cost of hydrogen peroxide. However, hydrogen peroxide, or other per compounds, may be used to accomplish the same result. Where aqueous hydrogen peroxide is used, it is necessary to add the amount of concentrated sulfuric acid which will keep the concentration of the hydroxylating solution at a desired concentration of, for example, 70% and which further will compensate for the water left behind by the decomposition of hydrogen peroxide. This, of course, is more expensive than regeneration by an electrolytic cell. There is no water left behind by the action of an electrolytic cell.

The method of this invention is broadly applicable to unsaturated fatty materials having from 11 to 22 carbon atoms. More particularly, it is useful with respect to hydroxylating tallow, tallow fatty acids, esters of tallow fatty acids, undecylenic acid and naturally occurring oils, such as lard oil, soya bean oil, peanut oil, castor oil, olive oil and rape seed oil. The term "unsaturated fatty materials" as used herein and in the claims is intended to include unsaturated fatty acids and their functional derivatives, such as esters.

The method in accordance with this invention comprises charging the sulfuric acid solution into an electrolytic cell, subjecting it to electrolysis, the sulfuric acid solution acting as the anolyte, to form persulfuric acid and mixing the selected fatty material with the thus formed persulfuric acid while maintaining the mixture within a desired temperature range. The mixture is simultaneously vigorously agitated. After substantially all of the active oxygen has been given up, the remaining sulfuric acid solution is drawn off and the remaining ester may then be purified in accordance with conventional techniques. Thus, for example, it can be neutralized with respect to sulfuric acid, using, for example, NaOH or KOH and boiled with a generous amount of neutral water. The water will then be drawn off and the fatty material dried.

I have found that hydroxylation may be accomplished directly in the anolyte chamber of an electroyltic cell and that the fatty material may be added directly to sulfuric acid of the correct concentration in the anolyte and that the liberated nascent oxygen will add directly to the ethylenic bond to probably form an epoxy compound which is immediately opened by the aqueous sulfuric acid to form hydroxyl groups. I, therefore, may prefer to hydroxylate by adding the fatty material to the anolyte chamber of an electrolytic cell, or I may prefer to circulate the anolyte to a reaction vat containing the polyhydroxy compound.

Some of the objects of this invention can be achieved without the use of an electrolytic cell by building up the active oxygen content of a sulfuric acid solution of the proper concentration using, for example, hydrogen peroxide.

In the electrolytic cell there is liberated at the cathode pure hydrogen which may be recovered and used in many reactions. The concentration of the aqueous sulfuric acid solution is very important. Concentrations above 75% tend to darken and char the fatty materials, and raise the voltage for electrolysis and concentration below 65%, slow up reaction rate and do not produce a satisfactory product. Thus, a concentration of from 65% to 75% is necessary.

The temperature is also a very important factor. A temperature of 20 to 30° C. is preferred. At temperatures below 20° C. the reaction rate is slowed. Above 30° C. the hydroxylation is less quantitative, although it may be satisfactory for some uses. Above 50° C. there is cleavage of the chain. Below 10° C. is unsatisfactory. Thus, the widest temperature range for my process is 10° C. to 50° C.

If the ratio of aqueous sulfuric acid to unsaturated fatty materials is decreased below about .7 kilogram per mole of unsaturated fatty material, there is an appreciable loss of hydroxyl groups.

I have found that if the peroxygen content of the hydroxylating solution is maintained at from .3 to 1.0 per cent., it will give satisfactory results. The peroxygen content may be continuously built up by the addition of a stream of persulfuric acid of any economical concentration to the hydroxylator. The removal of spent sulfuric acid solution may be continuous or intermittent. Concentration of peroxygen above 1.0% may be used if adequate means are provided to remove the high heat of reaction in a short period of time.

I prefer to build up the peroxygen content of a solution to from over 1% to 3.0% in the anolyte of an electrolytic cell, adjust the peroxygen content by adding spent sulfuric acid to .3 to 1.0% active oxygen to avoid excessive heat and add the persulfuric acid solution to the fatty material and hydroxylate until the active oxygen content is substantially used, and then draw off the spent and add fresh active solutions until the reaction is complete.

The reaction will go to very low iodine numbers if an excess of 2 to 5% of the theoretical peroxygen is added.

There are other factors which also effect hydroxylation. Agitation should be vigorous, close control should be maintained to prevent sulfuric acid from picking up water from the air in a moist climate.

In order to derive the full value of my invention, the hydroxylated fatty materials should be processed as follows:

The hydroxylated fatty material is allowed to settle until there is a sharp layer between the fatty material on top and the spent sulfuric acid on the bottom. The spent sulfuric acid is drained off and the fatty layer is washed twice with luke warm water. The fatty material is then brought to a boil with generous quantities of water. The water layer is removed and replaced with a fresh layer of water. The oil is neutralized, with respect to sulfuric acid, with any alkali such as NaOH, KOH, Na$_2$CO$_3$ or NaHCO$_3$. It is again boiled for one hour with the neutral water solution. Since there will be split off some sulfuric acid, it is helpful to check the water solution occasionally and make the necessary adjustments to keep the solution neutral. This is only helpful when esters are hydroxylated and the boiling with sulfuric acid water solutions would cause excessive hydrolysis of the terminal ester groups.

The apparatus diagrammatically shown in Figure 1 is exemplary of apparatus which can conveniently be used to carry out the method in accordance with this invention. As shown in Figure 1, the apparatus has storage tank 2 containing sulfuric acid. The sulfuric acid passes from tank 2 through line 4 into electrolytic cell 6, which is regulated by a valve 8. The electrolytic cell 6 has a cathode 9, an anode 10 and a diaphragm 12. The diaphragm 12 is provided with an overflow opening 14. The cathode may be, for example, lead and the anode may be, for example, platinum. The catholyte is separated from the anolyte by the diaphragm, which may, for example, be a conventional ceramic diaphragm. The cell can have, for example, a net voltage of six, with, for example, a current density of one ampere per square centimeter. A cooling coil 16 is provided to maintain the cell at the desired temperature.

A line 18 is provided to carry the overflow from electrolytic cell 6 to pump 20, which has its outlet connected to line 22 leading to persulfuric acid storage tank 24. A line 26 connects tank 24 to a hydrolyzer 28. Line 26 has a control valve 30 and is connected to a by-pass line 32, which leads back to the electrolytic cell 6, which has a control valve 34.

The hydrolyzer 28 has a jet nozzle 36, which is connected to line 26 and also to a steam line 38. Hydrolyzer 26 is connected to vat 40 by line 42, which has a valve 44.

Vat 40 contains an agitator 46, which is driven by a motor 48 and also has a cooling coil 50.

The selected fatty material is supplied through line 52, which has a valve 54. A gravity separator 56 is connected to vat 40 by a line 58, which has a valve 60. Separator 56 is connected to line 62, which in turn is connected to line 64 by a two-way valve 66. The valve 66 is connected to line 68, which is connected to the input end of pump 70. The output end of pump 70 is connected to line 72, which in turn leads to storage tank 2. By-pass line 74 leads from line 72 to vat 40 and has a control valve 76.

Line 64 has a control valve 78 and is cross-connected to line 52 by line 80, which has a valve 81.

As will readily be seen, sulfuric acid is provided to electrolytic cell 6 from storage tank 2 and acts as the electrolyte. The anolyte is carried to storage tank 24 and it can, in all or in part, be reintroduced to the anolyte side of the electrolytic cell. The anolyte (persulfuric acid) passes through line 26 to hydrolyzer 28, where it is subjected to steam from the jet 36.

Prior to the introduction of the hydroxylated persulfuric acid to vat 40, the fatty material is introduced and cooled in vat 40 from line 52. As the persulfuric acid is introduced into vat 40, it is thoroughly mixed with fatty material by agitator 46.

After the active oxygen has been given up, the sulfuric acid solution is drawn off into separator 56, where it is separated from fatty materials and returned to storage tank 2 through line 68, pump 70 and line 72. The remaining fatty material in vat 40 is then passed through separator 56, and, together with the separated fatty material in separator 56, is drawn off through line 64. If the hydroxylation of the polyhydroxy compound has not been as complete as desired, all, or a portion, of the drawn off fatty material can be returned to vat 40 for further processing through lines 80 and 52.

Figure 2:
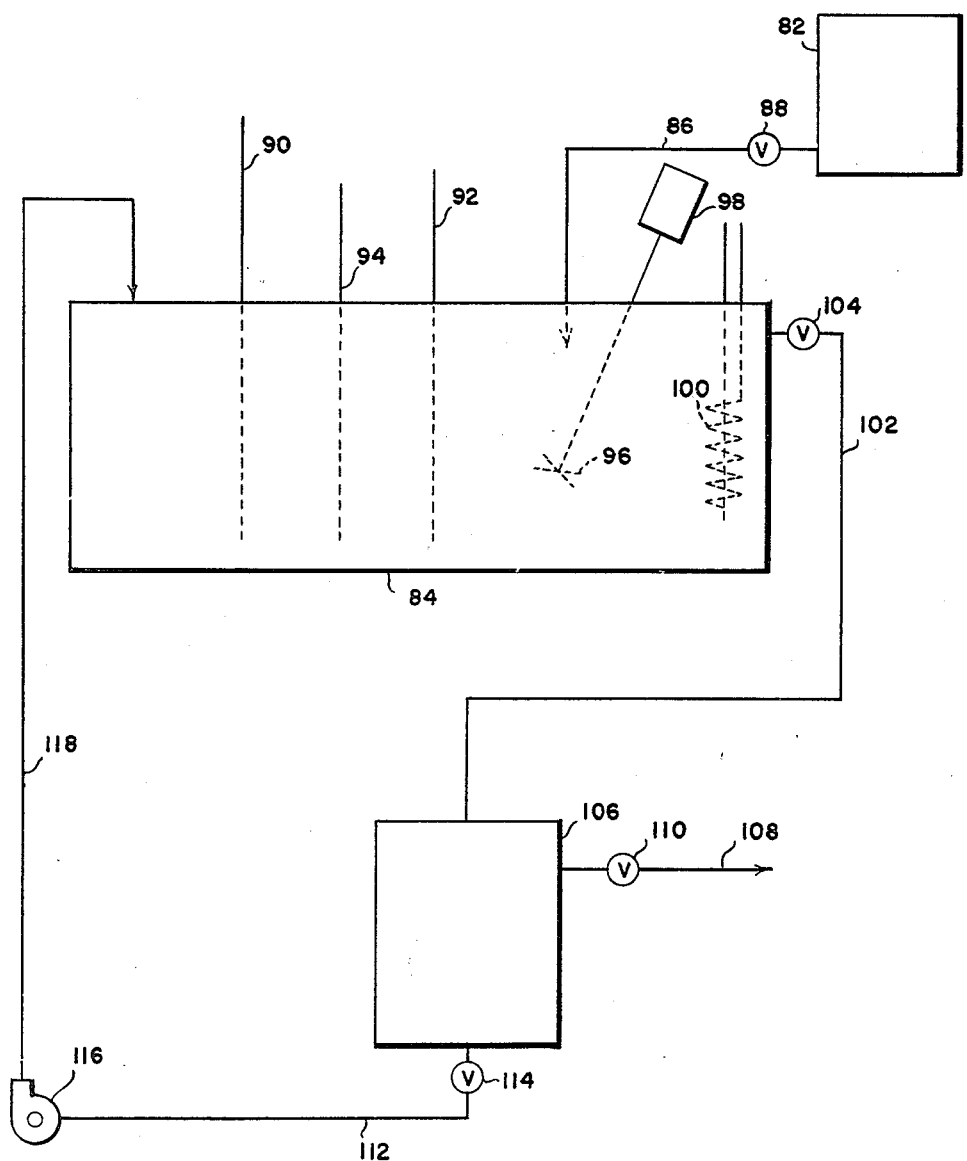
Figure 2 is a schematic diagram of an alternative arrangement of apparatus for carrying out the method of this invention.

There is shown in Figure 2 a second illustrative apparatus which is satisfactory for carrying out the process in accordance with this invention.

Referring now to Figure 2, a storage tank 82 is utilized for storing the selected fatty material. Tank 82 is connected to an electrolytic cell 84 through line 86 having a control valve 88. The electrolytic cell 84 has a cathode 90 and an anode 92, which may respectively be made of lead and platinum. A diaphragm 94 is located intermediate cathode 90 and anode 92 and extends to a position close to the bottom of electrolytic cell 84. The diaphragm may be, for example, a conventional ceramic diaphragm. An agitator 96, driven by a motor 98 is located in the anode side of the electrolytic cell. On the same side of the cell is located a cooling unit 100, utilized to keep the temperature within a desired range. Line 102 is connected to electrolytic cell 84 to carry off the overflow of anolyte and has a control valve 104. Line 102 is connected to a separator 106. Line 108 is connected to separator 106 to draw off fatty material and has a control valve 110. A line 112 having a control valve 114 is connected to the bottom of separator 106 and is adapted to draw off aqueous sulfuric acid. Line 112 is connected to the input end of a pump 116. Pump 116 is connected to the cathode side of electrolytic cell 84 by a line 118, connected to the discharge end.

As will readily be apparent, an aqueous sulfuric acid solution is introduced to the cathode side of the electrolytic cell 84 and the selected fatty material is drained from the tank 82 into the anode side of the cell. Vigorous agitation is accomplished by agitator 96 and the proper temperature is maintained by cooling unit 100. The hydroxylated fatty material and aqueous sulfuric acid is drawn off through line 102 into separator 106, where the hydroxylated fatty material separates out from the aqueous sulfuric acid and is drawn out through line 108. The aqueous sulfuric acid is returned to the cathode side of the electrolytic cell through lines 112, pump 116 and line 118. It will be appreciated that this is a continuous process and permits the reuse of sulfuric acid solution.

This invention will be further exemplified by the following specific examples, Examples 1 through 4 being illustrative of unsatisfactory results by failure to follow the limits of the invention:

Example 1

100 grams of the butyl oleate, butyl palmitate, butyl stearate derived from tallow fatty acids were charged to 200 grams of aqueous 63.5% sulfuric acid solution. The active oxygen content was built up to .4% with hydrogen peroxide. The mixture was agitated with a high speed agitator and held at 25–30° C. during reaction. The active oxygen was used up in 35 minutes. The active oxygen content was built up to .4% again with hydrogen peroxide and the necessary sulfuric acid added to keep the concentration at 63.5% and this process repeated until 5% above the theoretical active oxygen had been added. The reaction time was 2 hours and 20 minutes. The spent sulfuric acid solution was drawn off the ester layer. The esters were washed, neutralized with NaOH and boiled for one hour with generous quantities of neutral water. The water was drawn off and the esters were dried.

The iodine number of the product was dropped from 48 to 3.5 but the product had only 41.5% of the theoretical hydroxyl groups (determined by acetyl number). The per cent. sulfuric acid in the aqueous solution was too low for quantitative hydroxylation.

Example 2

100 grams of the butyl oleate, butyl palmitate, butyl stearate derived from tallow fatty acids were charged to 200 grams of aqueous 77% sulfuric acid solution. The active oxygen content was built up to .4% with hydrogen peroxide and the necessary sulfuric acid added to keep the concentration at 77%. The mixture was agitated with a high speed agitator and held at 25–30° C. for the reaction period. The active oxygen content was used up in 30 minutes. The active oxygen content was built up again in a similar manner and this process repeated until 5% above the theoretical active oxygen had been added. The ester was processed as in Example 1.

The iodine number of the product was dropped from iodine number 48 to 5.5 but the product had only 46.0% of the theoretical hydroxyl groups. The esters were very dark in color. The per cent. sulfuric acid in the aqueous solution was too high for quantitative hydroxylation.

Example 3

100 grams of the butyl oleate, butyl palmitate, butyl stearate derived from tallow fatty acids were charged to 200 grams of aqueous 68.5% sulfuric acid solution. The active oxygen content was built up to .4% with hydrogen peroxide. The mixture was agitated with a high speed agitator. The active oxygen was used up in 30 to 40 minutes. The active oxygen content was built up to .4% again with hydrogen peroxide and the necessary sulfuric acid added to keep the concentration at 68.5% and this process repeated until 5% above the theoretical active oxygen had been added. The temperature was held at 55 to 60° C. The ester was processed as in Example 1.

The iodine number of the resulting product was dropped from 48 to 2.0. However, the ester was dark and had only 52.5% of the theoretical hydroxyl groups due to the high temperature.

Example 4

Using the apparatus of Figure 2, 200 grams of the butyl oleate, butyl palmitate, butyl stearate derived from tallow fatty acids were charged to 50 grams of aqueous 69.5% sulfuric acid solution. The active oxygen content was built up to .4%. The mixture was agitated with a high speed agitator and held at 25-30° C. for the reaction period. The active oxygen content was used up in 50 minutes. It was built up again and this process repeated until 5% above theoretical active oxygen had been added.

The ester was processed as in Example 1. The iodine number of the product was 9.0. The product contained 63% of the theoretical hydroxyl groups.

Example 5

1000 grams of the butyl oleate, butyl palmitate, butyl stearate derived from tallow fatty acids were charged to 2000 grams of aqueous 69.6% sulfuric acid solution. The active oxygen content was built up to .4% with hydrogen peroxide. The mixture was agitated with a high speed agitator and held at 25 to 30° C. for the reaction period. The active oxygen content was used up in 45 minutes. The active oxygen content was built up again with hydrogen peroxide and the necessary sulfuric acid added to keep the concentration at 69.6% and this process repeated until 5% above the theoretical active oxygen had been added. The esters were processed as in Example 1.

The final iodine number was 2.2. The product was a very light color and had the theoretical number of hydroxyl groups. High temperature alkaline scission of the product showed that there had been no shifting of the double bond. The hydroxyl groups were in the 9,10 positions.

Example 6

100 grams of the butyl oleate, butyl palmitate, butyl stearate derived from tallow fatty acids were charged to 200 grams of aqueous 68.5% sulfuric acid solution. The active oxygen content was built up to .4% with hydrogen peroxide. The mixture was agitated with a high speed agitator and held at 40-45° C. for the reaction period. The active oxygen content was used up in 20 minutes. The active oxygen content was built up again with hydrogen peroxide and the necessary sulfuric acid added to keep the concentration at 68.5% and this process repeated until 5% above the theoretical active oxygen had been added. The esters were processed as in Example 1.

The iodine number was dropped from 48 to 5.5. The product was a light color but due to the high temperature there was about 86% of theoretical hydroxyl groups present on the ester molecule.

Example 7

Using the apparatus of Figure 2, 200 grams of the butyl oleate, butyl palmitate, butyl stearate derived from tallow fatty acids were charged to 100 grams of aqueous 69.0% sulfuric acid solution. The active oxygen content was built up to .4%. The mixture was agitated at high speed and held at 25-30° C. during reaction.

The active oxygen was used up in 25 minutes. It was built up again to .4% and this process repeated until 5% above the theoretical active oxygen had been added. The ester was processed as in Example 1.

The final iodine number was 3.3. There was 91% of the theoretical hydroxyl groups present.

Example 8

The butyl oleate, butyl palmitate, butyl stearate derived from tallow fatty acids were added to the anoylte of an electrolytic cell. The anolyte contained 68% sulfuric acid. The anode was platinum. The cathode was lead. The anoylte was separated from the catholyte by a ceramic diaphragm. The cell was allowed to operate at 25-32° C. The net voltage of cell was 6. The current density was 1 ampere per square centimeter.

The ester was hydroxylated for one hour in the anolyte chamber. At the end of that time it was decanted from the cell and processed as in Example 1.

The hydroxylation went quantitatively and the product was of good odor and color.

Example 9

Using the apparatus of Figure 2, to 200 grams of 70% aqueous surfuric acid there was added 100 grams of prime lard oil. The active oxygen content of the sulfuric acid solution was built up to .4%. The mixture was agitated with a high speed agitator. The active oxygen was consumed in 35 minutes and was replaced until a 5% excess of theoretical had been added. The temperature was maintained at 25 to 30° C. The esters were processed as in Example 1.

The hydroxylated product had the theoretical number of hydroxyl groups for the iodine number.

Example 10

Using the apparatus of Figure 2, 60 grams of commercial oleic acid (approximately 80% purity) were charged to 200 grams of 68% aqueous sulfuric acid. The active oxygen content was built up to .4%. The mixture was agitated with a high speed agitator and held at 25-30° C. The active oxygen was used up in about 30 minutes. It was built up to .4% again and this process repeated until 5% above the theoretical active oxygen had been added. The spent sulfuric acid layer was drawn off.

The dihydroxy acids were separated and boiled for one hour, with generous quantities of water. The water layer was drawn off and the 9,10 dihydroxy stearic acid was neutralized with respect to sulfuric acid. The iodine number was 6.5 and the product had the theoretical number of hydroxyl groups.

Example 11

Using the apparatus of Figure 2, 50 grams of a good grade of undecylenic acid were charged to 200 grams of 68% aqueous sulfuric acid solution. The active oxygen content was built up to .5%. The mixture was agitated with a high speed agitator and held at 25–30° C. The active oxygen was used in about 30 minutes. It was built up to .5% again and this process repeated until 7% excess had been added. The acid was processed as in Example 6. The iodine number was 1.8 and the 10,11 dihydroxy undecanoic acid was of light color and had the correct number of hydroxyl groups.

*Example 12.—High concentration and low temperature*

Using the apparatus of Figure 1, 100 grams of the butyl oleate, butyl palmitate, butyl stearate derived from tallow fatty acids were charged to 200 grams of aqueous 74% sulfuric acid solution. The active oxygen content of the sulfuric acid had been built up to .4% by anodic oxidation in the electrolytic cell. The mixture was agitated with a high speed agitator and held at 15–25° C. The active oxygen was used in about 35 minutes. It was built up to .4% again with persulfuric acid from the anolyte of the electrolytic cell and this process repeated until 5% above the theoretical active oxygen had been added. The reaction time was two and one-half hours. The esters were processed as in Example 1, except the esters were neutralized with KOH.

The iodine number was 2.1 and the product had 94% of the theoretical hydroxy groups.

*Example 13.—Low concentration*

Using the apparatus of Figure 1, 1000 grams of the butyl oleate, butyl palmitate, butyl stearate derived from tallow fatty acids were charged to 2000 grams of aqueous 66% sulfuric acid solution. The active oxygen content of the sulfuric acid had been built up to .4% by anodic oxidation in an electrolytic cell. The mixture was agitated with a high speed agitator and held at 20–27° C. The active oxygen was used in 45 minutes. It was built up again with persulfuric acid from the anolyte of the electrolytic cell. Some spent acid was drawn off and recirculated to the catholyte and thence to the anolyte of the cell. This process was repeated until 5% above the theoretical active oxygen had been added. The reaction time was 3 and ½ hours. The ester was processed as in Example 1.

The iodine number was 3.2 and the product had 96% of the theoretical hydroxyl groups.

What is claimed is:

1. The method of converting unsaturated fatty materials having from 11 to 22 carbon atoms to polyhydroxy compounds which comprises subjecting to anodic oxidation in an electrolytic cell an aqueous sulfuric acid solution having a range of concentration of from 65% to 75% sulfuric acid to form persulfuric acid, immediately reacting the thus formed solution with the selected fatty material at a temperature within a range of from 10° C. to 50° C., agitating the reaction mixture and separating out the formed fatty material, and subjecting the formed fatty material to hydrolysis, spent persulfuric acid being regenerated to persulfuric acid in the anodic chamber of the electrolytic cell.

2. The method of converting unsaturated fatty materials having from 11 to 22 carbon atoms to polyhydroxy compounds which comprises subjecting to anodic oxidation in an electrolytic cell an aqueous sulfuric acid solution having a range of concentration of from 65% to 75% sulfuric acid to form persulfuric acid providing a per- oxygen content of the solution of from .3% to 1%, adding the selected unsaturated fatty material to the thus formed solution, maintaining the temperature of the mixture within a range of from 10° C. to 50° C., agitating the mixture and separating the formed fatty material from the mixture, and subjecting the formed fatty material to hydrolysis, spent persulfuric acid being regenerated to persulfuric acid in the anodic chamber of the electrolytic cell.

3. The method of converting unsaturated fatty materials having from 11 to 22 carbon atoms to polyhydroxy compounds which comprises subjecting to anodic oxidation in an electrolytic cell an aqueous sulfuric acid solution having a range of concentration of from 65% to 75% sulfuric acid to form persulfuric acid providing a peroxygen content of the solution of from .3% to 1%, removing the thus formed solution from the electrolytic cell and immediately mixing it with the selected fatty material, maintaining the temperature of the mixture within a range of from 10° C. to 50° C., agitating the mixture until substantially all the active oxygen has been given up and separating out the formed fatty material, subjecting the formed fatty material to hydrolysis, returning the sulfuric acid solution to the electrolytic cell and subjecting it to anodic oxidation.

4. The method of converting an oleic acid ester to a polyhydroxy compound which comprises subjecting to anodic oxidation in an electrolytic cell an aqueous sulfuric acid solution having a range of concentration of from 65% to 75% sulfuric acid to form persulfuric acid, immediately reacting the thus formed solution with the oleic acid ester at a temperature within a range of from 10° C. to 50° C., agitating the reaction mixture and separating out the formed fatty material, and hydrolyzing the formed fatty material, spent persulfuric acid being regenerated to persulfuric acid in the anodic chamber of the electrolytic cell.

5. The method of converting lard oil to polyhydroxy compounds which comprises subjecting to anodic oxidation in an electrolytic cell an aqueous sulfuric acid solution having a range of concentration of from 65% to 75% sulfuric acid to form persulfuric acid, immediately reacting the thus formed solution with the lard oil at a temperature within a range of from 10° C. to 50° C., agitating the reaction mixture and separating out the formed fatty material, and hydrolyzing the formed fatty material, spent persulfuric acid being regenerated to persulfuric acid in the anodic chamber of the electrolytic cell.

6. The method of converting oleic acid to 9,10 dihydroxy stearic acid which comprises subjecting to anodic oxidation in an electrolytic cell an aqueous sulfuric acid solution having a range of concentration of from 65% to 75% sulfuric acid to form persulfuric acid, immediately reacting the thus formed solution with the oleic acid at a temperature within a range of from 10° C. to 50° C., agitating the reaction mixture and separating out the formed fatty material and subjecting the formed fatty material to hydrolysis, spent persulfuric acid being regenerated to persulfuric acid in the anodic chamber of the electrolytic cell.

7. The method of converting undecylenic acid to 10,11 dihydroxy undecanoic acid which comprises subjecting to anodic oxidation in an electrolytic cell an aqueous sulfuric acid solution having a range of concentration of from 65% to 75% sulfuric acid to form persulfuric acid, immediately reacting the thus formed solution with the undecylenic acid at a temperature within a range of from 10° C. to 50° C., agitating the reaction mixture and separating out the formed fatty material, and subjecting the formed fatty material to hydrolysis, spent persulfuric acid being regenerated to persulfuric acid in the anodic chamber of the electrolytic cell.

References Cited in the file of this patent

UNITED STATES PATENTS

| Number | Name | Date |
|---|---|---|
| 2,510,905 | Raczynski | June 6, 1950 |

OTHER REFERENCES

Swann, Jr.: The Hydroxylation of Double Bonds, Bulletin, November 24, 1930, University of Illinois, pp. 8, 12, 13.